(12) United States Patent
Yoshida (10) Patent No.: US 8,888,367 B2
(45) Date of Patent: Nov. 18, 2014

(54) LINEAR MOTION GUIDE UNIT

(71) Applicant: Nippon Thompson Co., Ltd., Minato-ku, Tokyo (JP)

(72) Inventor: Yoshihiro Yoshida, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/902,001

(22) Filed: May 24, 2013

(65) Prior Publication Data

US 2013/0315512 A1 Nov. 28, 2013

(30) Foreign Application Priority Data

May 25, 2012 (JP) ................. 2012-119564

(51) Int. Cl.
*F16C 29/06* (2006.01)
*F16C 33/10* (2006.01)
*F16C 33/66* (2006.01)

(52) U.S. Cl.
CPC ........... *F16C 33/6648* (2013.01); *F16C 29/065* (2013.01); *F16C 33/6681* (2013.01); *F16C 29/0609* (2013.01)
USPC ............................................ 384/13; 384/45

(58) Field of Classification Search
CPC .. F16C 29/06; F16C 29/0602; F16C 29/0611; F16C 29/0633; F16C 29/0638; F16C 29/0647; F16C 29/0652; F16C 29/0654; F16C 29/0657; F16C 29/0659; F16C 29/0661; F16C 29/0664; F16C 29/0666; F16C 29/0609; F16C 33/6648; F16C 33/6681
USPC ................................................ 384/13, 43–45
See application file for complete search history.

(56) References Cited

U.S. PATENT DOCUMENTS

| 2008/0080795 A1* | 4/2008 | Kuwabara et al. ............... 384/13 |
| 2009/0060400 A1* | 3/2009 | Kuwabara et al. ............... 384/13 |
| 2012/0195535 A1* | 8/2012 | Shibuya et al. .................. 384/13 |

FOREIGN PATENT DOCUMENTS

| JP | 2008082433 A | 4/2008 |
| JP | 2008111458 A | 5/2008 |
| JP | 2011149469 A | 8/2011 |

* cited by examiner

*Primary Examiner* — Phillip A Johnson
(74) *Attorney, Agent, or Firm* — Browdy and Neimark, PLLC (57) ABSTRACT

Lubrication for rolling elements is carried out within the turnaround passages. For resupply of lubricant, the end seals and end caps have lubricating holes lying in alignment with each other to allow any lubricant injection needle piercing through there. A porous compact impregnated with lubricant fits in a concavity in the end cap. The concavity has an opening to communicate the concavity with the turnaround passage. The porous compact is composed of reservoirs, conjunctive parts, and applicator noses extending through openings to expose their tips into the turnaround passages. The lubricating hole in the end cap has a slit through which the porous compact is exposed to the lubricating hole to allow the lubricant flowing into the porous compact.

10 Claims, 11 Drawing Sheets

LINEAR MOTION GUIDE UNIT

FIELD OF THE INVENTION

The present invention relates to a linear motion guide unit comprised of an elongated guide rail and a slider designed to move on the elongated guide rail relatively to the guide rail by virtue of more than one rolling element, and in which the slider has therein a porous compact for lubrication.

BACKGROUND OF THE INVENTION

Linear motion guide units have been extensively applied in recent years between relatively sliding parts for linear reciprocating mechanism used in increased industrial fields including semiconductor fabricating equipment, machine tools, industrial robots, and so on. Most prior linear motion guide units have been ordinarily fed with lubricant at regular intervals through any oiling port to ensure smooth lubrication for the rolling elements throughout a circulating circuit. Recently advanced machines and instruments, nevertheless, are increasingly needed to make them virtually maintenance-free from many aspects of conserving energy as well as keeping running cost and maintenance cost of equipment reasonably less than ever. Correspondingly, the linear motion guide units incorporated in the advanced machinery, especially the linear motion guide units of the sort applied between relatively sliding parts for linear reciprocating mechanism, are also challenged to keep down the consumption of lubricant to a minimum, along with realizing virtual maintenance-free operation where lubricant resupply is less needed over long-lasting operation. With the linear motion guide units constructed as stated earlier, continuous application of lubricant around the rolling elements is indispensable to continue maintaining an adequate lubricant film around the rolling elements to keep them against metal-to-metal contact while rolling through the circulating circuits, thereby making sure of their high durability.

In Japanese Laid-Open Patent Application No. 2008-111, 458 which is a commonly-assigned senior application, there is disclosed a linear motion guide unit having a guide rail of a matter of 10 mm in width and more than one very small or miniature roller of 1 mm or so in diameter. With the prior linear motion guide unit constructed as stated earlier, a retainer plate to support the rollers in a load-carrying race and end caps are joined together each other to provide an endless circulating circuit with no gap to allow the rollers smoothly rolling through there with keeping adequate posture. A slider has a carriage, end caps, rollers rolling through the endless circulating circuits, the retainer plate extending along the load-carrying races on the carriage to keep the rollers inside the load-carrying races, and a binding strip to fasten the retainer plate to the carriage. The retainer plate at lengthwise ends thereof is coupled together with spigots extending out of the end caps to communicate turnaround passages in the end caps. The spigots conform complementarily to the lengthwise ends of the retainer plate to fit over the lengthwise ends of the retainer plate. Especially, butting extremities of the retainer plate and the associated spigots are made beveled ends in complementary relation to one another aslant in the sliding direction.

In another Japanese Laid-Open Patent Application No. 2008-82, 433 which is a commonly-assigned senior application, moreover, there is disclosed a linear motion guide unit in which application of lubricant around the rolling elements was done at the turnaround passage to make the lubrication system simpler than ever in construction, along with maintenance-free for steady and positive oil lubrication. With this prior linear motion guide unit, a porous compact impregnated with lubricant fits into a concavity made on an outward end surface of the end cap. The concavity is deep pitted to open into the turnaround passage in the end cap. The porous compact impregnated with lubricant is placed in the concavity in the end cap in such a way as to expose in part itself to the turnaround passage through the deep pit. Thus, the porous compact makes contact with the rolling elements running through the turnaround passage to come to supply with the lubricant around the rolling elements.

With the prior linear motion guide unit constructed as stated earlier, the resupply of lubricant is done through the grease nipple into the turnaround passages in the end cap, but wouldn't be applied directly to the porous compact impregnated with lubricant.

In Japanese Laid-Open Patent Application No. 2011-149, 469 which is also a commonly-assigned senior application, there is disclosed a linear motion guide in which the porous compacts impregnated with lubricant are installed in the recesses inside the inward end surfaces of the end caps facing each other or opposite to the forward and aft end surfaces of the carriage to is between the end caps and the carriage. With this prior linear motion guide unit, the porous compact impregnated with lubricant is fitted into the recess in a fashion exposed in part to the turnaround passage through an opening in the turnaround passage so that the rolling elements rolling through the turnaround passages, as coming into rolling-contact with the part of the porous compact exposed out of the opening, are applied with the lubricant.

With the prior linear motion guide unit constructed as stated just above, however, the resupply of lubricant is done through the grease nipple into the turnaround passages in the end cap. Oiling paths for lubricant reaching the turnaround passages are defined by the end caps and the porous compact impregnated with lubricant. The resupplied lubricant at the grease nipple is absorbed in the porous compact while getting in contact with the porous compact in the oiling paths. Thus, the prior linear motion guide units with grease nipple have need of a lubrication port structure with female threads to fit over the grease nipple. Because the lubrication port structure takes up a considerable space, it is inevitable to make the porous compact impregnated with lubricant less in volume and, therefore, making the end cap large in size enough to accommodate the grease nipple.

Meanwhile, with the miniaturized linear motion guide unit in which tiny rollers are built as a four-row array around the guide rail having a width of for example 12 mm, our experts have ever tried doing the lubrication for the rollers at the turnaround passages in the end cap with using the porous compact lying on the outward end surface of the end cap in the face of the end seal, the porous compact having a lubricant reservoir, whose a part protrudes to be exposed in the turnaround passage through the opening pitted in the end cap.

On the other side, the linear motion guide unit constructed as stated earlier normally has a binding strip to fasten a retainer plate to the slider to keep the rolling elements against falling away from a load-carrying race, and for the sake of which the end cap on its outward end surface facing on the end seal has grooves into which the bent ends of the binding strip fit to make snap-engagement with the associated end cap. Because the grooves to retain the binding strip take up a large space across the outward end surface of the end cap and further there is no space for the provision of the grease nipple in the end cap, it is impractical to make the porous compact large in volume at either side of the lubricant reservoir and the applicator nose coming into contact with the rolling elements.

It was found that making the porous compact excessively large in volume would render overall the linear motion guide unit worse or less in mechanical strength. Moreover, the applicator nose of the porous compact, as undergoing repeated collisions with the rolling elements, is needed to have a mechanical strength enough to stand up to repeated impacts caused by the rolling elements.

SUMMARY OF THE INVENTION

The present invention has for its primary object to overcome the major challenges as stated earlier, and to provide a linear motion guide unit adapted to be used in a reciprocating mechanism built in semiconductor fabricating equipment, machine tools, industrial robots, and so on. The linear motion guide unit has a binding strip to fasten a retainer plate to keep the rollers against falling away from a slider. The present invention is particularly envisaged coping with lack of space for a lubrication system chiefly because grooves to fit over the binding strip are cut into an outward end surface of an end cap, which is in the face of the associated end seal. To this end, the present invention provides a linear motion guide unit in which an end cap has a concavity on an outward end surface thereof which faces directly towards an end seal of the slider, and a open-cellular or porous compact impregnated with lubricant fits into the concavity, the end cap having a hole to communicate the concavity with a turnaround passage inside the end cap no as to carry out application of the lubricant around rolling elements while rollers roll across the turnaround passage. With the linear motion guide unit constructed according to the present invention, more especially, application of lubricant to the turnaround passage can be done on the side of an end seal by using an injection needle of a syringe-type applicator and resupply of lubricant can be done at the same time. Thus, the lubrication system itself may be simplified in construction. Moreover, the porous compact, as adapted to conform to the deep concavity in the end cap, is allowed to have a lubricant reservoir capable of retaining lubricant therein as large in volume as possible. Even if the end cap is small in construction, the porous compact itself can have the lubricant reservoir which is impregnated with ample lubricant enough to conduct steady and sustainable application of lubricant around the rollers and further the resupply of lubricant can be carried out easily with accompanying maintenance-free lubrication over a long-lasting period.

The present invention is concerned with a linear motion guide unit comprising an elongated guide rail having two sides, each side having a pair of first raceway surfaces extending lengthwise of the guide rail, and a slider that fits over or conforms to the elongated rail for movement in a sliding manner relative to the elongated guide rail; wherein the slider has a carriage, a pair of end caps, end seals, porous compacts, and a plurality of rolling element, the carriage having a pair of second raceway surfaces extending in opposition to the pair of first raceway surfaces on the guide rail to provide a pair of load-carrying races between the pair of first raceway surfaces and the pair of second raceway surfaces, and a pair of return passages extending along the pair of load-carrying races, the end caps being fastened on forward and aft end surfaces of the carriage, one to each end surface, and provided therein with turnaround passages to join together the pair of load-carrying races and the pair of return passages, the end seals being attached on outward end surfaces of the end caps, the porous compacts being impregnated with lubricant and installed in concavities in the end caps to open to the end seals, and the rolling elements being allowed to roll through circulating circuits made up of the pair of load-carrying races, the pair of return passages and the turnaround passages, and in doing no make rolling contact with the porous compacts at the turnaround passages to be applied with the lubricant; and wherein each of the end caps has an end surface facing on the end surface of the carriage and having lubricating grooves reaching the turnaround passages and a first lubricating hole extending across the end cap in a sliding direction of the slider to communicate with the lubricating grooves, and each of the end seals has a second lubricating hole lying in alignment with the first lubricating hole and extending across the end seal, the second lubricating hole being smaller in diameter than the first lubricating hole, but allowing an applicator needle for lubricant to pierce through the second lubricating hole, whereby the lubricant supplied from the applicator needle through the second hole in the end seal, after having gone through the first lubricating hole, is resupplied from the lubricating grooves to the turnaround passages to lubricate the rolling elements and the lubricant is resupplied to the porous compact which is in part exposed to the first lubricating hole so that the lubricant is applied to the rolling elements through the porous compact at the turnaround passages.

Moreover, the first lubricating hole is in a boss portion lying midway between widthwise opposite sides of the end cap, the first lubricating hole having a slit which starts from the outward end surface of the end cap and extends across a preselected length in the sliding direction to open to the porous compact whereby the lubricant resupplied through the second lubricating hole in the end seal is applied to the porous compact through the slit. The first lubricating hole has a circular contour in cross section and the slit lies lower than a middle of the circular contour. As an alternative, the porous compact has a third lubricating hole lying midway between widthwise opposite sides of the end cap, so that the lubricant resupplied through the second lubricating hole in the end seal is fed into the third lubricating hole in the porous compact and then applied into the first lubricating hole in the end cap.

The end cap is composed of an end cap major body constituted with a central trunk portion and sidewise wings and a spacer part nested inside the end cap major body in opposition to the carriage to define the turnaround passage in combination with the end cap major body, and the porous compact fits snugly in the concavity which sink below the outward end surface of the end cap.

Further, the porous compact has first reservoirs to fit into deep pits of the concavity lying on sidewise opposite sides of the central trunk portion of the end cap major body, the second reservoir portion extending sidewise in the central trunk portion of the end cap major body to connect the first reservoirs with each other, third reservoirs extending to fit into shallow cavities of the concavity inside the wings to connect the first reservoirs with each other, applicator noses extending through openings to expose their tips into the turnaround passages, and conjunctive flat parts connecting the third reservoirs to the applicator noses. The second reservoir of the porous compact extends to intersect the first lubricating hole in the end cap to expose in part itself through the slit to the first lubricating hole. Moreover, the porous compact is made of a sintered resinous member of finely powdery ultrahigh molecular weight synthetic resin which is compacted under pressure together with the application of heat, the resulting sintered resinous member having open-porous texture in which pores are open to each other through interstices among synthetic resinous particles inside the sintered member, and the lubricant fills in the pores.

With the linear motion guide unit according to the present invention, the outward end surfaces of the end caps have grooves to make engagement with binding strips to fasten retainer plates which extend in the sliding direction to keep the rolling elements against falling away apart from the slider, and wherein the grooves open to the concavities in the end caps.

The return passage in the carriage is defined with a lengthwise sleeve which fits into a through-bore in the carriage, the lengthwise sleeve at one end thereof being integral with the spacer nested inside one of the end cap major bodies and at the other end thereof making fit-engagement with the other of the end cap major bodies.

With the linear motion guide unit constructed as stated earlier, the second reservoir of the porous compact lying in the middle of the end cap is made larger in thickness or volume than in the conventional construction to increase the reserved amount of lubricant. In addition, the boss portion lying in the middle of the end cap is reduced in size to make it possible to out partially the first lubricating hole in the boss portion to provide the slit. Thus, the present invention makes it easier to enhance the volume of the second reservoir of the porous compact to increase the amount of lubricant preserved in the second reservoir. Since the lubricating hole in the end cap is cut partially in the sliding direction of the slider to make the slit where the porous compact is exposed to the lubricating hole, the lubricant flowing in the lubricating hole is absorbed in part in porous compact. As a result, the lubricant is applied to the turnaround passages through the lubricating grooves, while simultaneously the lubricant in part is resupplied directly to porous compact with accompanying maintenance-free lubrication over a long-lasting period.

The linear motion guide unit of the present invention is concerned with a miniature roller-type linear motion guide unit in which application of lubricant around the rolling elements is carried out in the turnaround passages. The use of the lubricating hole in place of the conventional grease nipple results in ensuring a plenty space for the porous compact in the end cap thereby to allow the porous compact to have the volume large for the liner motion guide unit. In addition to the resupply of lubricant from the lubricating hole through the lubricating grooves, the direct resupply of lubricant into the porous compact is made possible by exposure of the porous compact to the lubricating hole. Even though the linear motion guide unit is very small in construction, thus, the lubrication system designed according to the present invention makes it possible to carry out the direct resupply of lubricant into the porous compact and, therefore, succeeds in retaining constantly a plenty of lubricant with accompanying maintenance-free lubrication over a long-lasting period. With the linear motion guide unit of the present invention, moreover, the reservoir of the porous compact can be placed below the lubricating hole because there in no need of grease nipple. As a result, the volume of the porous compact in the present invention increases by about 20% than in the prior liner motion guide unit with grease nipple to make it possible to retain more amount of lubricant in the porous compact. Thus, the porous compact retainable more amount of lubricant helps steady and positive application of the lubricant around the rolling elements with maintenance-free operation for lubrication over a prolonged service life. With the linear motion guide unit constructed as stated earlier, it is allowed to connect the porous compacts in substantially U-shape. This connection of the porous compacts makes mobility of lubricant in the porous compacts easier to protect the lubricant retained in any only one of the porous compacts would be consumed lack of balance.

DETAILED DESCRIPTION OF THE PREFERRED EMBODIMENTS

The linear motion guide unit of the present invention is adapted for use in any relatively sliding components in machinery as diverse as robotic machines, semiconductor fabricating equipment, precision machines, measurement/inspection instruments, medical instruments, micromachines, and so on. Especially, the present invention is intended to develop the linear motion guide unit, which can cope with demand to keep better lubrication to the rolling elements, thereby making sure of smooth movement of the rolling elements throughout the circulating circuit.

A preferred embodiment of the linear motion guide unit constructed according to the present invention will be described in detail by reference to the drawings. The linear motion guide unit of the present invention is of the sort having four rows of load-carrying races for the rollers and in general composed of an elongated guide rail 1 having only a pair of first raceway surfaces 11 lying one on top of the other and extending lengthwise on each widthwise opposing sides 66 of the guide rail 1, and a slider 2 that fits over or conforms to the elongated rail 1 for movement in a sliding manner relative to the elongated guide rail 1. More especially, the linear motion guide unit of the present invention includes a plurality of rollers 7, which is allowed to roll through circulating circuits 45 made up of load-carrying races 40 defined between the guide rail 1 and the slider 2, return passages 15 extending lengthwise in the slider 2 in parallel with the load-carrying races 40 and turnaround passages 30 connecting the load-carrying races 40 with the return passages 15. The slider 2 is a type of solid block having threaded holes 18 which are used to fasten the slider 2 to any counter part. It is to be noted that the present invention is motivated to develop a downsized or miniature linear motion guide unit whose slider 2 is lacking in space for conventional grease nipple because of using for example a guide rail of a matter of 10 mm in width and more than one very small or miniature roller of 1 mm or so in diameter.

The slider 2 chiefly has a carriage 3, end caps 4, end seals 8, porous compacts 10 impregnated with lubricant and a plurality of rollers 7. The carriage 3 has sidewise bulges or wings extending beyond the width of the guide rail 1, the wings being each provided thereon with a pair of second raceway surfaces 12 lying one on top of the other and extending in opposition to the pair of first raceway surfaces 11 on the guide rail 1 to provide a pair of load-carrying races 40 between the pair of the first raceway surfaces 11 and the pair of second raceway surfaces 12 and a pair of the return passages 15 lying one on top of the other and extending along the pair of the load-carrying races 40. The end caps 4 are fastened on forward and aft end surfaces 67 of the carriage 3 in the lengthwise direction of the carriage 3, one to each end surface 67, and provided therein with the turnaround passages 30 to join together the pair of load-carrying races 40 and the pair of return passages 15. The end seals 8 are attached on outward end surfaces 53 of the end caps 4 and provided with lips 60 to close clearances left between the guide rail 1 and the slider 2. The porous compacts 10 impregnated with lubricant are fitted inside concavities 31 in the end caps 4. The rollers 7 are allowed to roll through the pair of circulating circuits 45 made up of the pair of load-carrying races 40, the pair of return passages 15 and the turnaround passages 30. With the linear motion guide unit constructed as stated earlier, the end caps 4 and the end seals 8 are fastened to the carriage 3 with using fastening bolts 33 which are tightened in threaded holes 32 of the carriage 3 after having extended through fastening holes 37 of the end caps 4 and fastening holes 57 counterbored at 62 in the end seals 8. The end caps 4 each have a lubricant path or lubricating hole 35 of 1.5 mm in diameter and the end seals 8 each have a lubricating hole 9 of 0.5 mm in diameter. Resupply of lubricant may be carried out by insertion of an applicator needle of a lubricating syringe into the lubricating hole 9 of the end seal 8.

With the linear motion guide unit constructed as stated earlier, the rollers 7 rolling through one of the pair of circulating circuits 45 are allowed to transfer from the downside load-carrying race 40, carrying downward load because of the slider 2, into the associated return passage 15 in the carriage 3 in a circulating manner. In contrast, the rollers 7 rolling through the other of the pair of circulating circuits 45 are allowed to transfer from the upside load-carrying race 40, carrying upward load because of the slider 2, into the associated return passage 15 in the carriage 3 in a circulating manner. Moreover, the guide rail 1 has some holes 17 that are used to fasten the guide rail 1 to any stationary bed including a machine bed, mounting base, and so on, while the carriage 3 of the slider 2 is made therein with some threaded holes 18 that are used to fasten the slider 2 to any component including a workpiece, a variety of instruments, and so on. On the bottom of the slider 2, there are provided lower seals 14. The end cap 4 is composed of an end cap major body 5 constituted with a central portion 41 and sidewise bulges or wings 42, and a spacer part 6 nested inside the end cap major body 5 in opposition to the carriage 3 to define the turnaround passage 30 in combination with the end cap major body 5. The return passage 15 in the carriage 3 is defined with a lengthwise sleeve 13 which fits loosely into a through-bore 16 in the carriage 3 and makes fit-connection at one end thereof with one of the end cap major bodies 5. The sleeve 13 is made of the same material of synthetic resin as in the spacer part 6 and at one end thereof is made integral with the spacer part 6. Moreover, the sleeve 13 at the other end thereof is formed in a stepwise edge 64 to make fit-engagement with a complementary edge 69 of the end cap major body 5. Upon assembly of the carriage 3 with the end caps 4 into the slider 2, after the end caps 4 have been arranged on the forward and aft ends 67 of the carriage 3, the stepwise edge 64 on the free end of the sleeve 13 connected with one of the end cap major bodies 5 comes into the fit-engagement with the complementary edge 69 on the other end cap major body 5 lying across the carriage 3 as the result of introduction of spigots 47 on the end caps 4 into the carriage 3.

Figure 20:
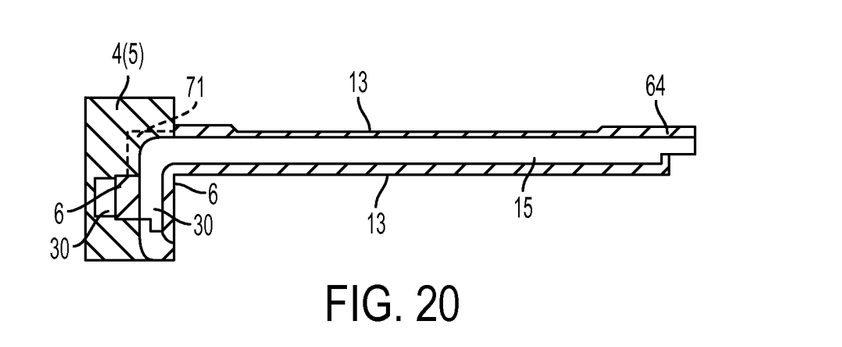
FIG. 20 is a fragmentary view in longitudinal section of the end cap in which a spacer part integral with a sleeve forms one of turnaround passages.
Figure 21:
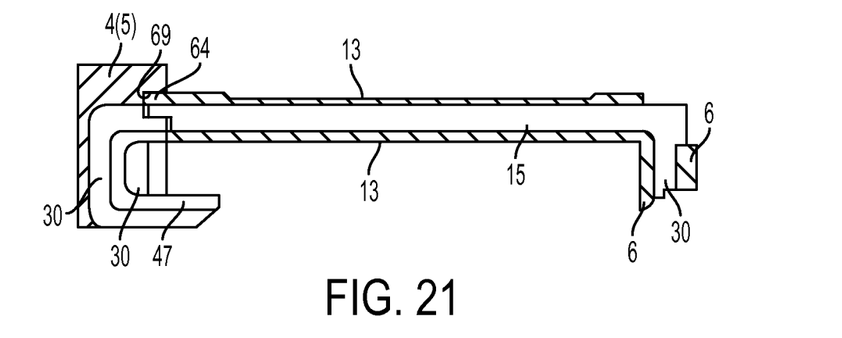
FIG. 21 is a fragmentary view in longitudinal section of the end cap in which another spacer part integral with the sleeve forms the other of turnaround passages.

The turnaround passages 30 in the sidewise bulges or wings 42 of the end cap 4 include inner turnaround passages 51 shorter or shallow in the end and cap 4 and outer turnaround passage 52 longer or deep in the end and cap 4, and these turnaround passages 51 and 52 get intersected at right angles each other and staggered relative to each other. The end cap 4 is constituted with the spacer part 6 integral with the sleeve 13 to define an inside curved surface of the turnaround passage 30 and the end cap major body 5 to define an outside curved surface of the turnaround passage 30. The spaces part 6 integral with the sleeve 13 provides an inside curved surface of the outer turnaround passage 52 inside a recess 71 in the end cap major body 5, while forming a part of an outside curved surface of the inner turnaround passage 51 and an inside curved surface of the inner turnaround passage 51. The spacer part 6 integral with the sleeve 13 is placed in such an arrangement that the inner turnaround passage 51 and the outer turnaround passage 52 intersect at right angles with each other. The circulating circuits 45 are each made up of the load-carrying race 40, the return passage 15, the outer or longer turnaround passage 52 and the inner or shorter turnaround passage 51, both the turnaround passages 52 and 51 being defined with the end cap major body 5 and the spacer part 6, respectively. Moreover, the geometry of intersection between the inner turnaround passage 51 and the outer turnaround passage 52 alternates with each other in the widthwise direction of the end cap 4 perpendicular to the traveling direction of the slider 2. With the turnaround passages 30 lying in the right wing of the end cap 4, the outer turnaround passage 52 connects the downside load-carrying race 40 with the upside return passage 15 while the inner turnaround passage 51 connects the upside load-carrying race 40 with the downside return passage 15. In contrast, with the turnaround passages 30 lying in the left wing of the end cap 4, the outer turnaround passage 52 connects the upside load-carrying race 40 with the downside return passage 15 and the inner turnaround passage 51 connects the downside load-carrying race 40 with the upside return passage 15.

With the linear motion guide unit of the present invention, the end cap major body 5 has the spigot 47 which is designed to connect with a retainer plate 26. Extremities of the spigot 47 and the retainer plate 26 to make end-to-end abutment with each other are made beveled in complementary relation to one another aslant in the sliding direction (not shown).

This complementary fit between the retainer plate 26 and the spigots 47 keeps the boundary between the butting ends thereof against causing any gap between them, helping the rollers 7 roll through the circulating circuits 45 without getting caught or falling in any gap that would otherwise be liable to occur between butting ends, making sure of smooth and orderly travel of the rollers throughout the circulating circuits 45. The spigot 47 is formed at entrance of the turnaround passage 30 to cooperate with the spacer part 6 to interconnect smoothly the turnaround passage 30 in the end cap 4 with the return passage 15 in the carriage 3. The end cap 4 has a pair of the spigots 47 in longitudinally registry with the return passages 15 in the carriage 3 and therefore, after the spacer part 6 integral with the sleeve 13 has come into abutment against the associated spigot 47 of the end cap 4, the return passage 15 in the carriage 3 is brought into alignment with the associated spigot 47 of the end cap 4. Thus, the end-to-end abutment between the sleeve 13 and the spigot 47 of the end cap 4 comes into flush connection of the return passage 15 with the turnaround passage 30 to finish the circulating circuits 45 of rectangle in transverse section with causing no discontinuity or gap at the connection between them. Coplanar continuity with no gap between the turnaround passage 30 in the end cap 4 and the return passage 15 defined by the sleeves 6 inside a fore-and-aft bore 16 in the carriage 3 helps the rollers 7 transfer smoothly from the turnaround passage 30 to their associated return passage 15 and also from the return passage 15 to the turnaround passage 30 in a circulating manner. The linear motion guide unit of the present invention is envisaged providing a miniaturized linear motion guide unit in which the rollers 7 are chosen as the rolling elements. The retainer plate 26 is installed to keep in place the rollers 7 during their rolling throughout the circulating circuits 40 and further keep the rollers 7 against falling away from the slider 2 after the slider 2 has taken away from the guide rail 1. The retainer plate 26 fits along a wedged ridge 29 thereof in a lengthwise groove 28 lying between the raceway surfaces 12 on the carriage 3 and is fastened to the carriage 3 by means of a binding strip 27 which is fastened to the slider 2 after opposite bent ends thereof has come into fit into grooves 39 out in the end caps 4.

Figure 8:
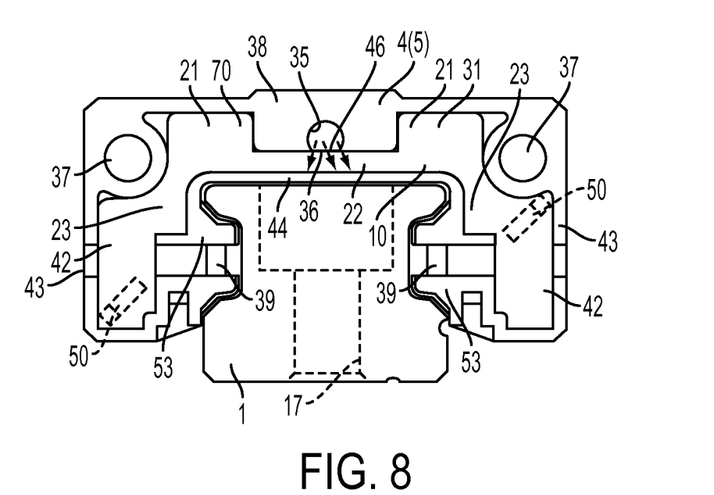
FIG. 8 is a view in end elevation of the end cap, but in which the end seal is removed to show the porous compact which has fit in the concavity in the end cap.
Figure 9:
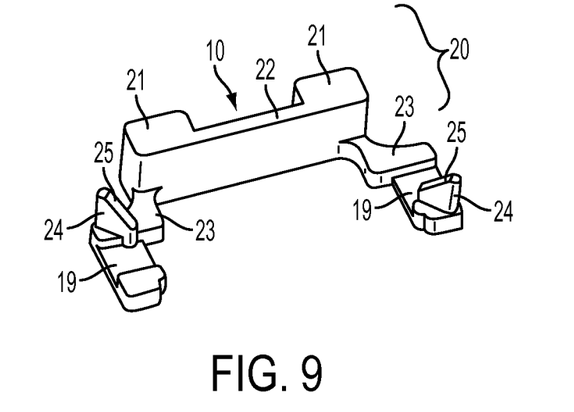
FIG. 9 is a view in perspective showing the porous compact to be impregnated with lubricant and incorporated in the end cap.
Figure 10:
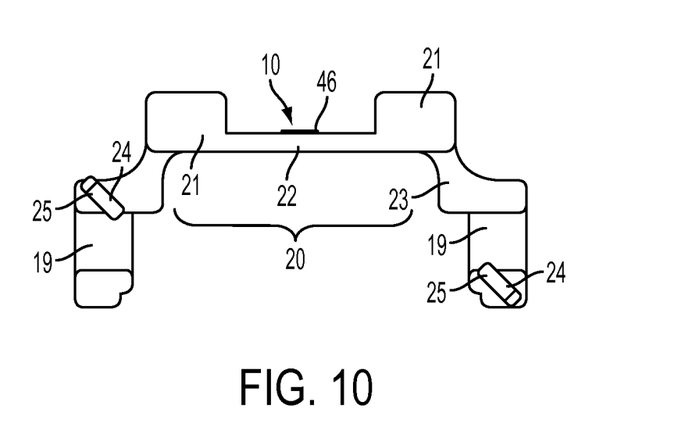
FIG. 10 is a view in end elevation of the porous compact of FIG. 9, as seen from the side of the carriage.
Figure 11:
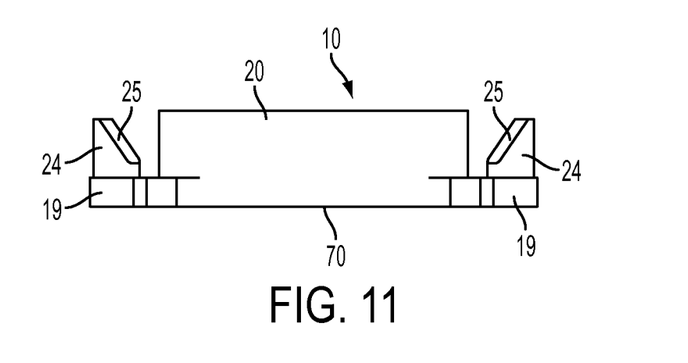
FIG. 11 is a view in bottom of the porous compact FIG. 9, as seen from the side of a guide rail.
Figure 12:
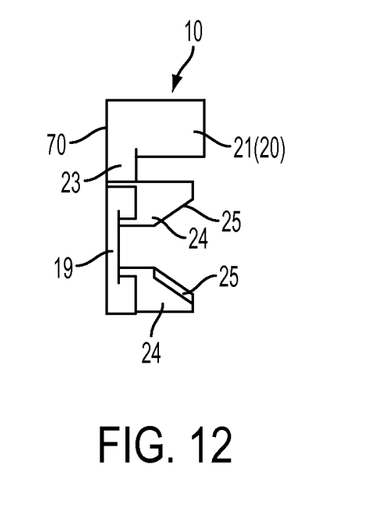
FIG. 12 is a view in side elevation of the porous compact of FIG. 9.
Figure 13:
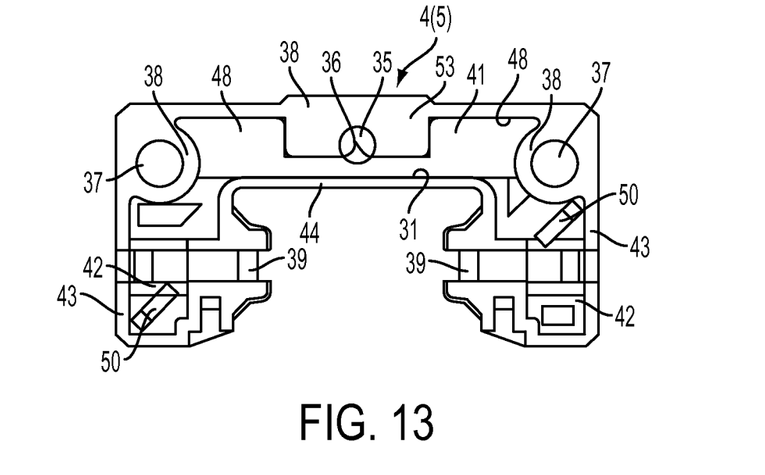
FIG. 13 is a view in end elevation of the end cap, as seen from the side of the end seal.
Figure 14:
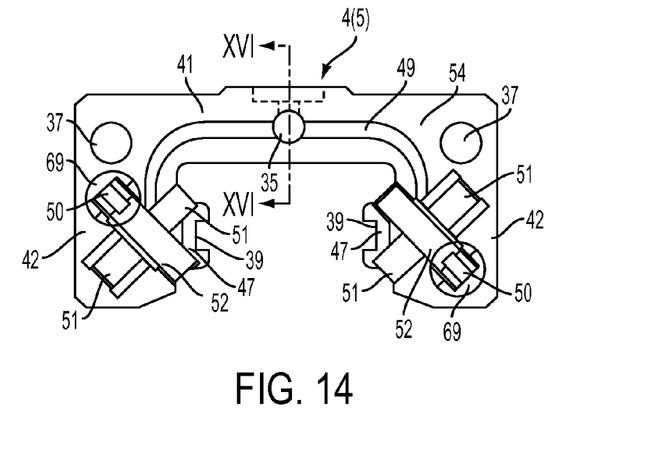
FIG. 14 is a view in end elevation of the end cap, as seen from the side of the carriage.
Figure 15:
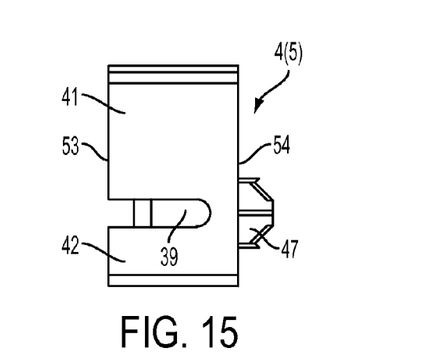
FIG. 15 is a view in side elevation of the end cap.
Figure 16:
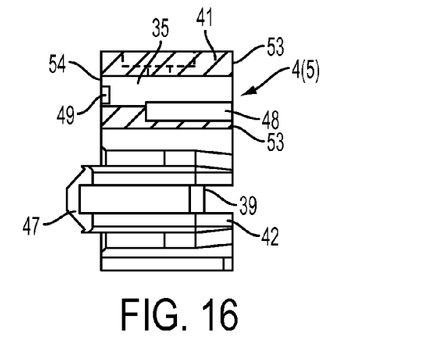
FIG. 16 is a view in longitudinal section of the end cap taken along the plane of line X VI-X VI of FIG. 14.

With the linear motion guide unit constructed as stated earlier, the end cap major body 5 for the end cap 4 has the concavity 31 to fit over the porous compact 10 impregnated with lubricant. The porous compact 10 is accommodated in the concavity 31 in such a relation that an outward surface 70 of the porous compact 10 comes into close contact with an inward surface 63 of the end seal 8. More especially, the end cap 4 on an inward surface 54 thereof facing on the carriage 3 has lubricating grooves 49 reaching the turnaround passages 30 and the lubricant path, or first lubricating hole 35, and the end seal 8 has a lubricant hole, or a second lubricating hole 9, which extends in the sliding direction of the slider 2 with a diameter smaller than the lubricating hole 35, but allowing of inserting the applicator needle of the lubricator. The lubricant supplied from the lubricator through at least the lubricating hole 35 is resupplied to both the porous compact 10 and the turnaround passages 30. Arrows depicted in FIG. 8 are to imagine how the lubricant is resupplied from the lubricating hole 35 to the porous compact 10. The lubricating hole 35 is in a boss portion 38 lying at the middle of the end cap 4 and extends across a preselected length in the sliding direction to provide a slit 36 which opens to the porous compact 10 to apply the lubricant to an exposed surface 46 of the porous compact 10. The surface 46 exposed to the slit 36 is on a second reservoir portion 22 of the porous compact 10. In the concavity 31 out in the end cap major body 5 in the end cap 4, there are as shown in FIGS. 8 and 14 provided the lubricating hole 35 lying at the middle of the end cap 4 and the lubricating grooves 49 extending while curving from the lubricating hole 35 into the sidewise wings 42, instead of the conventional grease nipple. The curved lubricating grooves 49 are cut very narrow in width till the turnaround passages 30 to feed the turnaround passages 30 with lubricant. On the other hand, as the porous compact 10 is kept in contact with the lubricant over the slit 36, the lubricant resupplied through the slit 36 makes sure of lubrication over a more prolonged maintenance-free service life for lubrication.

With linear motion guide unit, moreover, the concavity 31 is made to extend into an outward end surface 53 facing on to the end seal 8 to spread over a trunk portion 41 and the sidewise wings 42 of the end cap major body 5 to fit snugly over a lubricant reservoir 20 of the porous compact 10. The porous compact 10 has an overall contour or configuration befitted to fit into the concavity 31 inside the end cap major body 5. The porous compact 10 as shown in FIGS. 9 to 12 has first reservoirs 21 to fit into deep pits 48 lying in sidewise opposition to each other in the concavity 31, the second reservoir portion 22 extending sidewise in the trunk potion 41 to connect the first reservoirs 21 with each other, third reservoirs 23 extending to fit into the concavity 31 inside the wings 42, applicator noses 24 extending through openings 50 to expose their tips into the turnaround passages 31, and conjunctive parts 19 connecting the third reservoirs 23 to the applicator noses 24. The lubricant reservoir 20 impregnated with a plenty of lubricant is mainly composed of a pair of the first reservoirs 21 of thick blocks lying in upside and sidewise opposition to each other, the second reservoir 22 of flat her extending between the first reservoirs 21, and the third reservoirs 23 extending downwards from the first reservoirs 21, respectively. A pair of the conjunctive parts 19 fits into the concavity 31 in the wings 42 in the end cap major body 5. The pair of conjunctive parts 19 has the applicator noses 24, respectively, which to come into the rollers 7 rolling through the turnaround passages 30 to apply the lubricant around the rollers 7. Each of the applicator noses 24 at a leading edge thereof slants to have a contact surface 25 which is disposed to expose itself to the turnaround passage 30 through the opening 50 at a curved area in the turnaround passage 30. With the porous compact 10 constructed as stated earlier, it is desirable to increase the amount of lubricant reserved in the reservoirs. To this end, the end cap 4 is out away to make the boss portion 38 as less in thickness as permitted to provide the slit 36, thereby making it possible to enlarge the thickness or volume of the second reservoir 22 in the lubricant reservoir 20. Thus, the increase in the volumetric capacity of the second reservoir 22 of the porous compact 10 results in the increase of the volume of the lubricant preserved in the porous compact 10. Simultaneously with the above, the lubricant path 35 is also cut off partially to make the slit 36 where the porous compact 10 is exposed at the surface 46 thereof to the lubricating hole 35 so that the lubricant is resupplied to the exposed surface 46 of the porous compact 10.

The porous compact 10 is made of finely granular particles of ultrahigh molecular weight synthetic resin, which is first subjected to compacting and then sintering at elevated temperature. The sintered resinous compact product has open-porous or open-cellular texture whose pores or cells preserved among fine particles are open each other through interstices or channels. Lubricant is well absorbed and preserved in the pores or cells in the porous compact 10. The lubricant, as being better kept or preserved in the porous compact 10, is protected from spontaneously oozing out only by fitting the porous compact 10 into the concavity 31. The porous compact 10 from a fine powder of synthetic resin of polyethylene or polypropylene, because of better in generally preserving the accurate dimensions, can snugly fit or conform to certain concavities sophisticated in contour and continue applying steadily the lubricant around the rollers 7 without causing clog pores or cells at leading edges which would come into engagement with the rollers 7. The exposed contact surface 25 of the applicator nose 24 in the porous compact 10 is oriented to extend along the rolling direction of the rollers 7 in the turnaround passage 30. More especially, the exposed or contact surface 25 of the applicator nose 24 in the porous compact 10 has a length ranging for example from 1.0 to 1.5 times the diameter of the roller 7, and the width ranging for example from 30 to 50% of the axial distance of the roller 7. The orientation and dimensions as recited earlier of the exposed or contact surface 25 of the applicator nose 24 serve well to afford the rollers 7 more time to make rolling contact with the contact surface 25, helping continue applying more steadily the lubricant around the rollers 7. The porous compact 10 is desired to make the volume thereof as large as possible to preserve the lubricant to the maximum. To this end, the porous compact 10 has the lubricant reservoirs 20 designed to fit fully or snugly in the deep pits 48 so as to make the most of the deep pits 48 in the concavity 31. Thus, the porous compact 10 can preserve plenty of lubricant in the lubricant reservoir 20 even if the linear motion guide unit is downsized in construction. Just snug-fit of the porous compact 10 into the concavity 31 is sufficient to accomplish the maintenance-free condition for lubrication over a prolonged service life. Moreover, the lubricant may be resupplied to the second reservoir 22 through the slit 36 opened to the lubricant path 35 in the boss 38 of the end cap major body 5.

With the linear motion guide unit of the present invention, the retainer plate 26 extends in the sliding direction of the slider 2 to keep in place the rollers 7. The retainer plate 26 is fastened by means of the binding strip 27 which makes engagement with the grooves 39 out in the outward end surfaces 53 of the end caps 4. The grooves 39 open to the concavities 31 in the end caps 4. The porous compact 10 impregnated with lubricant is installed inside the concavity 31 which sinks or extends into the outward end surface 53 of the end cap 4 facing onto the end seal 8. The rollers 7 while rolling through the turnaround passage 30 is applied with the lubricant in the porous compact 10 through the opening 50 in the turnaround passage 30. The concavity 31 of the end cap major body 5 is surrounded with an exterior frame 43 and an interior wall 44 left on the outward end surface 53 of the end cap major body 5. Thus, the concavity 31 gets concaved to spread widthwise across the left and right wings 42 of the end cap 4 and therefore the porous compact 10 fits in the concavity 31 in a fashion lying across left and right wings 42 of the end cap 4. With the version illustrated here, the end cap 4 is downsized in construction and therefore the concavity 31 spreads from the trunk portion 41 of the end cap major body 5 up to the wings 42 extending in the widthwise direction perpendicular to the traveling direction of the slider 2.

Figure 1:
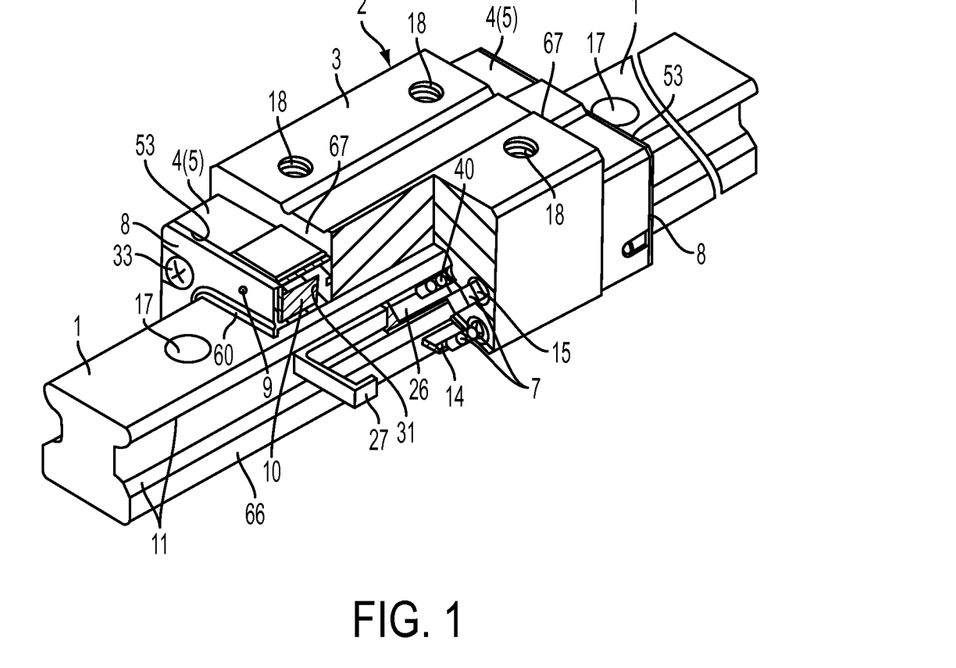
FIG. 1 is a fragmentary and partially cutaway view in perspective showing a preferred embodiment of a linear motion guide unit according to the present invention.
Figure 2:
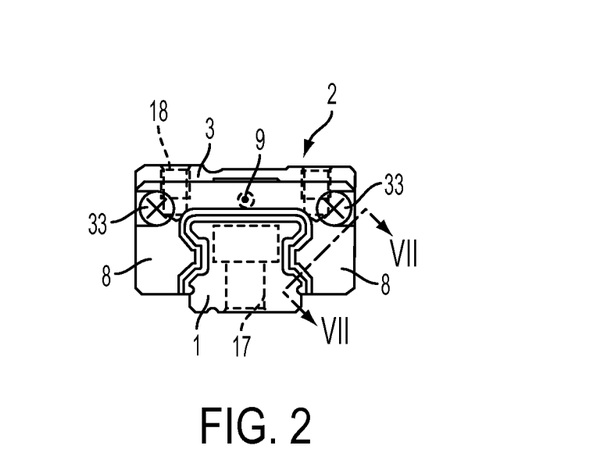
FIG. 2 is a view in front elevation of the linear motion guide unit of FIG. 1.
Figure 3:
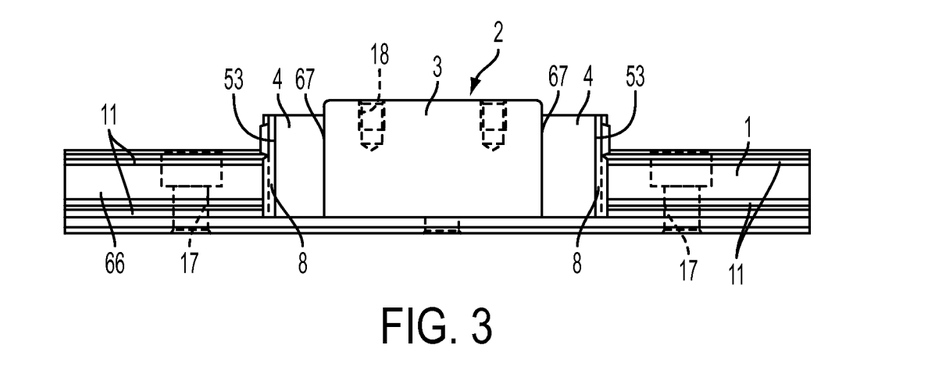
FIG. 3 is a view in side elevation of the linear motion guide unit of FIG. 1.
Figure 4:
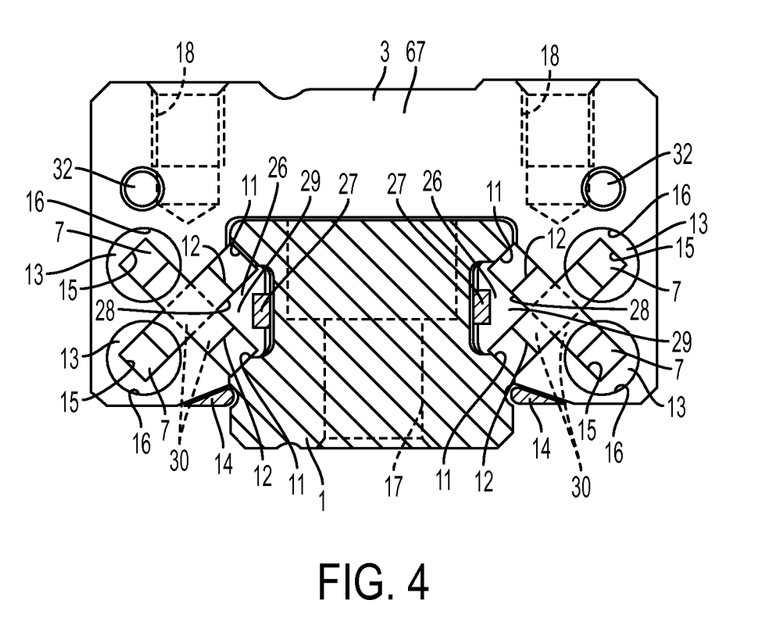
FIG. 4 is a view in end elevation of the linear motion guide unit of FIG. 1, but in which an end cap is removed to illustrate a carriage and a guide rail is shown in a transverse cross section.
Figure 5:
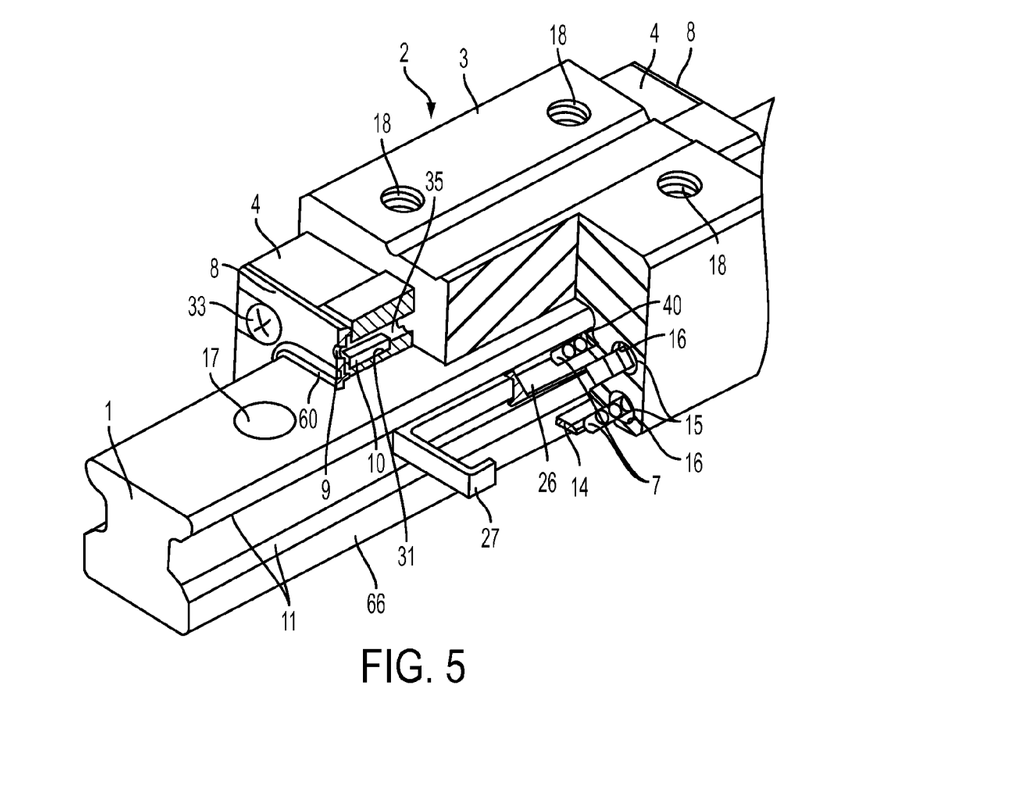
FIG. 5 is an enlarged fragmentary and partially cutaway view in perspective to show a resupply hole for lubricant in an end seal of the linear motion guide unit of FIG. 1.
Figure 6:
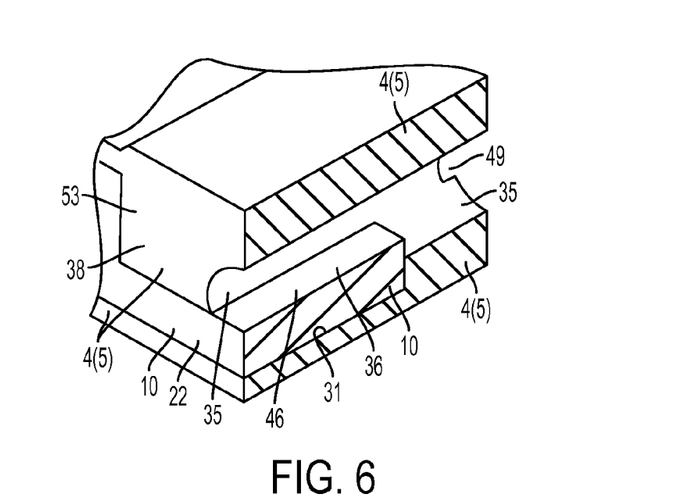
FIG. 6 is an enlarged fragmentary and partially cutaway view in perspective to illustrate in more detail the resupply hole extending in an end cap of FIG. 5 to be exposed to a lubricant-impregnated porous compact which fits in a concavity formed in the end cap.
Figure 7:
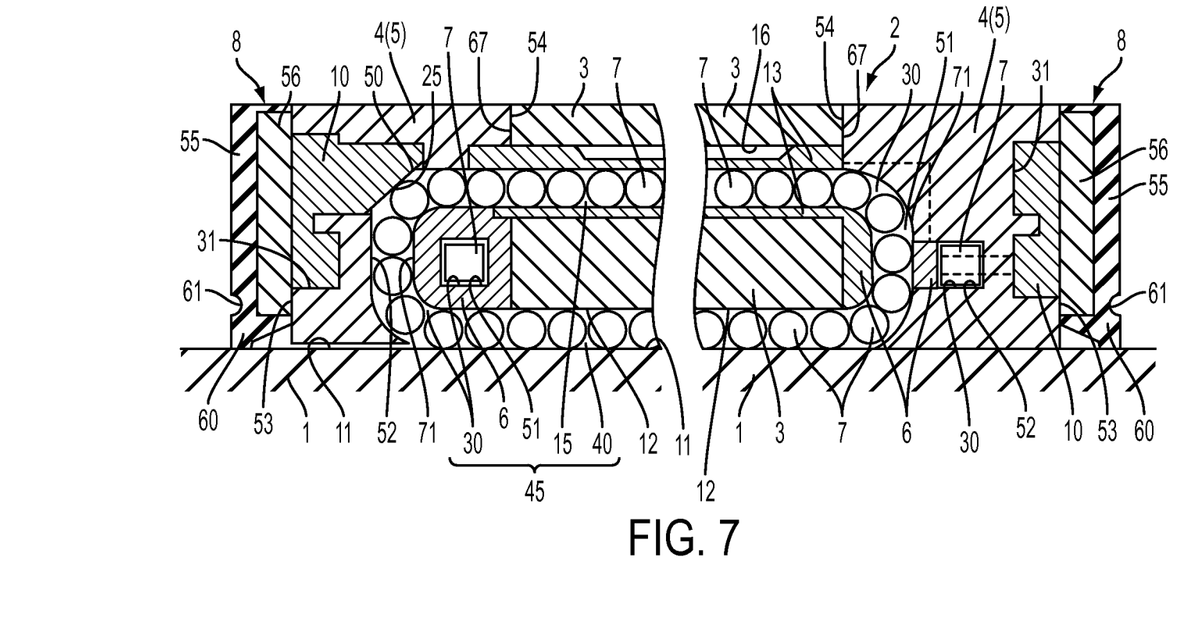
FIG. 7 is a view in longitudinal section showing a circulating circuit in the linear motion guide unit of FIG. 1, the view being taken partly on the planes of line VII-VII of FIG. 2.
Figure 17:
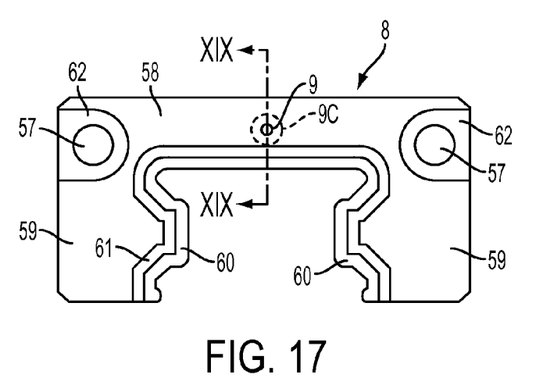
FIG. 17 is a view in front elevation of the end seal.
Figure 18:
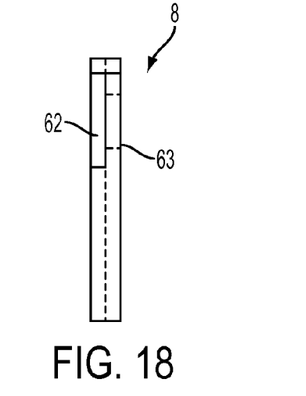
FIG. 18 is a view in side elevation of the end seal.
Figure 19:
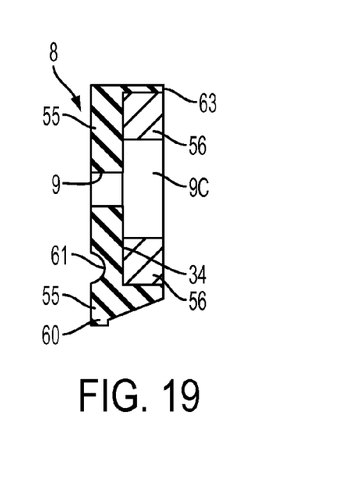
FIG. 19 is an enlarged fragmentary view in longitudinal section of the end seal taken along the plane of line X IX-X IX of FIG. 17 extending across the resupply hole for lubricant in the end seal.

The following will explain an embodiment of the resupply system for lubricant in the linear motion guide unit of the present invention. Referring to especially FIGS. 5 and 6, the lubricating hole 35 in the end cap major body 5 of the end cap 4 is circular in cross section and out away partially at a lower side thereof to provide the slit 36 extending in sliding direction of the slider 2. The lubricating hole 35 may be made in any polygon including quadrilateral and no on, not shown, other than circular configuration. The porous compact 10 at the surface of the second reservoir 22 is exposed to the slit 36 which is made the lubricating hole 35 in the end cap major body 5 of the end cap 4. The end seal 8 as shown in FIGS. 17 to 19 is composed of a rubber member 55 having a lip 60 on an outward surface thereof and a recess 34 on an inward end surface 63 thereof facing onto the end cap 4, and a metallic core 56 which fits firmly into the recess 34 in the rubber member 55. The lubricating hole 9 is in an upper major portion 58 flanked by sidewise wings 59. The metallic core 56 has a lubricating bore 9C larger in diameter than the lubricating hole 9. The lips 60 are placed on the inward sides of the wings 59 in opposition to the guide rail 1. Grooves 61 are formed along the lips 60 in parallel with the lips 60. Supplement of the lubricant into the lubricating hole 35 in the end cap 4 can be done after an injection needle of a syringe-type lubricant applicator has been forced into the lubricating hole 9 and the lubricating bore 9G. The lubricant resupplied into the lubricating hole 35 flows through the lubricating grooves 49 into the turnaround passages 30 and in doing so is absorbed into the porous compact 10 through the slit 36 where the second reservoir 22 of the porous compact 10 is exposed at the surface 46 to the lubricant inside the lubricating hole 35. In the lubricating hole 35 inside the end cap 4, there is provided a space serving as a lubricant pool which is defined between the exposed portion of the porous compact 10 and the end surface 67 of the carriage 3.

Figure 22:
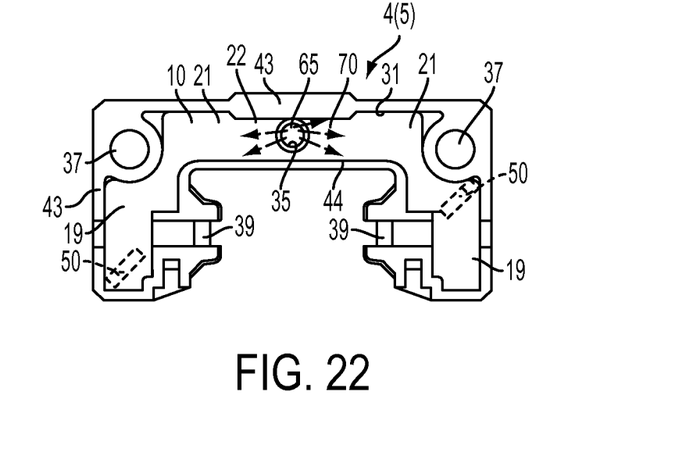
FIG. 22 is a view in end elevation of another version of the linear motion guide unit in which a resupply hole for lubricant is formed in the porous compact which fits into the concavity in the end cap.

Referring next to FIG. 22, there is shown another version of the resupply system for lubricant in the linear motion guide unit of the present invention. With this version, the end cap major body 5 in the end cap 4 has a small boss lying midway between widthwise opposite sides of the end cap 4. A lubricating hole 65, or a third lubricating hole, is directly made in the second reservoir 22 of the porous compact 10 which has fit in the concavity 31 in the end cap major body 5, which has the lubricant path 35 on a wall thereof facing onto carriage 3. The lubricating hole 65 in the porous compact 10 may have any contour in cross section but has a circular cross-section in FIG. 22. That is, the lubricating hole 65 is directly bored in the second reservoir 22 of the porous compact 10. Moreover, the lubricating hole 65 serves as the lubricant pool for the lubricant supplied from the lubricating hole 9.

Figure 23:
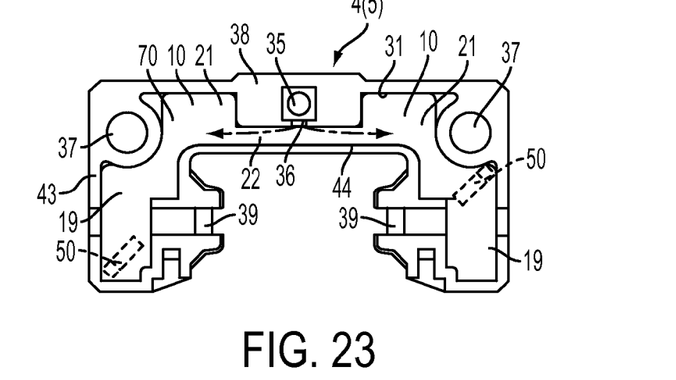
FIG. 23 is a view in end elevation of a further another version of the linear motion guide unit in which a resupply hole for lubricant in the end cap is formed in a polygonal shape.

Referring to FIG. 23, there is shown a further another version of the resupply system for lubricant. With this version, the end cap major body 5 in the end cap 4 has a small boss 38 lying midway between widthwise opposite sides of the end cap 4.

The lubricating hole 35 in the boss portion 38 is made in polygonal contour at the side of the end seal 8 and in circular contour at the side of the carriage 3, in FIG. 23, especially, the lubricating hole 35 is made in rectangular shape and circular shape.

The lubricating hole 35 at the lower side thereof has the slit 36 which extends in the sliding direction to open to the second reservoir 22 of the porous compact 10. Thus, the lubricant resupplied into the lubricating hole 35 is absorbed into the second reservoir 22 of the porous compact 10 through the slit 36.

Figure 24:
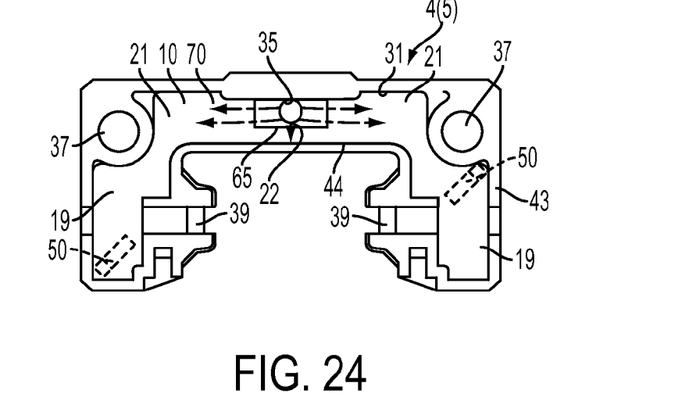
FIG. 24 is a view in end elevation of another version of the linear motion guide unit in which a resupply hole for lubricant in the porous compact is formed in a polygonal shape to provide a lubricant reservoir and FIG. 25 is a view in end elevation of a further another version of the linear motion guide unit in which a resupply hole varies in cross configuration on the way from the end seal to the carriage.

Further referring to FIG. 24, there is shown another version of the resupply system for lubricant. With this version, the end cap major body 5 in the end cap 4 has a small boss lying midway between widthwise opposite sides of the end cap 4. A lubricating hole 65 of nearly rectangular contour is directly made in the second reservoir 22 of the porous compact 10 which has fit in the concavity 31 in the end cap major body 5, which has the lubricating hole 35 on a wall thereof facing onto carriage 3. The lubricating hole 65 in FIG. 24 serves as the lubricant pool for the lubricant supplied from the lubricating hole 9.

Figure 25:
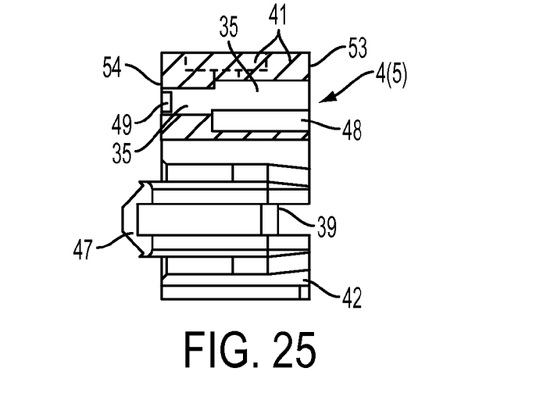

In a further another version in FIG. 25, the lubricating hole 35 in the end cap major body 5 varies in cross-sectional contour as going from the end seal 8 towards the carriage 3. Moreover, the lubricating hole 35 is made larger in cross-sectional contour to form the lubricant pool for the lubricant.

What is claimed is:

1. A linear motion guide unit; comprising an elongated guide rail having two sides, each side having a pair of first raceway surfaces extending lengthwise of the guide rail, and a slider that fits over or conforms to the elongated rail for movement in a sliding manner relative to the elongated guide rail; wherein the slider has a carriage, a pair of end caps, end seals, porous compacts, and a plurality of rolling element, the carriage having a pair of second raceway surfaces extending in opposition to the pair of first raceway surfaces on the guide rail to provide a pair of load-carrying races between the pair of first raceway surfaces and the pair of second raceway surfaces, and a pair of return passages extending along the pair of load-carrying races, the end caps being fastened on forward and aft end surfaces of the carriage, one to each end surface, and provided therein with turnaround passages to join together the pair of load-carrying races and the pair of return passages, the end seals being attached on outward end surfaces of the end caps, the porous compacts being impregnated with lubricant and installed in concavities in the end caps to open to the end seals, and the rolling elements being allowed to roll through circulating circuits made up of the pair of load-carrying races, the pair of return passages and the turnaround passages, and in doing so make rolling contact with the porous compacts at the turnaround passages to be applied with the lubricant; and wherein each of the end caps has an end surface facing on the end surface of the carriage and having lubricating grooves reaching the turnaround passages and a first lubricating hole extending across the end cap in a sliding direction of the slider to communicate with the lubricating grooves, and each of the end seals has a second lubricating hole lying in alignment with the first lubricating hole and extending across the end seal, the second lubricating hole being smaller in diameter than the first lubricating hole, but allowing an applicator needle for lubricant to pierce through the second lubricating hole, whereby the lubricant supplied from the applicator needle through the second lubricating hole in the end seal, after having gone through the first lubricating hole, is resupplied from the lubricating grooves to the turnaround passages to lubricate the rolling elements and the lubricant is resupplied to the porous compact which is in part exposed to the first lubricating hole so that the lubricant is applied to the rolling elements through the porous compact at the turnaround passages.

2. The linear motion guide unit constructed as defined in claim 1, wherein the first lubricating hole is in a boss portion lying midway between widthwise opposite sides of the end cap, the first lubricating hole having a slit which starts from the outward end surface of the end cap and extends across a preselected length in the sliding direction to open to the porous compact whereby the lubricant resupplied through the second lubricating hole in the end seal is applied to the porous compact through the slit.

3. The linear motion guide unit constructed as defined in claim 2, wherein the lubricating first hole has a circular contour in cross section and the slit lies lower than a middle of the circular contour.

4. The linear motion guide unit constructed as defined in claim 1, wherein the porous compact has a third lubricating hole lying midway between widthwise opposite sides of the end cap, and wherein the lubricant resupplied through the second lubricating hole in the end seal is fed into the third lubricating hole in the porous compact and then applied into the first lubricating hole in the end cap.

5. The linear motion guide unit constructed as defined in claim 1, wherein the end cap is composed of an end cap major body constituted with a central trunk portion and sidewise wings, and a spacer part nested inside the end cap major body in opposition to the carriage to define the turnaround passage in combination with the end cap major body, and the porous compact fits snugly in a concavity which extends into the outward end surface of the end cap.

6. The linear motion guide unit constructed as defined in claim 5, wherein the return passage in the carriage is defined with a lengthwise sleeve which fits into a through-bore in the carriage, the lengthwise sleeve at one end thereof being integral with the spacer nested inside one of the end cap major bodies and at the other end thereof making fit-engagement with the other of the end cap major bodies.

7. The linear motion guide unit constructed as defined in claim 5, wherein the porous compact has first reservoirs to fit into deep pits of the concavity lying on sidewise opposite sides of the central trunk portion of the end cap major body, a second reservoir portion extending sidewise in the central trunk portion of the end cap major body to connect the first reservoirs with each other, third reservoirs extending to fit into shallow cavities of the concavity inside the wings to connect the first reservoirs with each other, applicator noses extending through openings to expose tips of the applicator noses into the turnaround passages, and conjunctive flat parts connecting the third reservoirs to the applicator noses.

8. The linear motion guide unit constructed as defined in claim 7, wherein the second reservoir of the porous compact extends to intersect the first lubricating hole in the end cap to expose in part itself to the first lubricating hole.

9. The linear motion guide unit constructed as defined in claim 1, wherein the porous compact is made of a sintered resinous member of powdery synthetic resin which is compacted under pressure together with the application of heat, the resulting sintered resinous member having open-porous texture in which pores are open to each other through interstices among synthetic resinous particles inside the sintered member, and wherein the lubricant fills in the pores.

10. The linear motion guide unit constructed as defined in claim 1, wherein the outward end surfaces of the end caps have grooves to make engagement with binding strips to fasten retainer plates which extend in the sliding direction to keep the rolling elements from falling apart from slider, and wherein the grooves open to the concavities in the end caps.

* * * * *